May 10, 1932.  J. J. C. HARDENBERG  1,857,540
DEVICE FOR MANUFACTURING HOLLOW GLASS BODIES
BY MEANS OF PRESSING AND BLOWING
Filed May 7, 1928
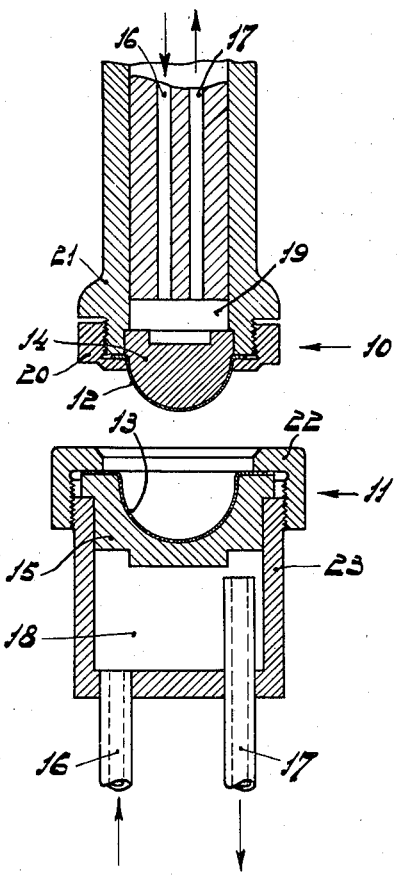

Patented May 10, 1932

1,857,540

UNITED STATES PATENT OFFICE

JAN JESAIJAS CHRISTIAAN HARDENBERG, OF EINDHOVEN, NETHERLANDS, ASSIGNOR TO L. A. NYPELS, OF THE HAGUE, NETHERLANDS

DEVICE FOR MANUFACTURING HOLLOW GLASS BODIES BY MEANS OF PRESSING AND BLOWING

Application filed May 7, 1928, Serial No. 275,813, and in the Netherlands December 10, 1927.

This invention relates to a device for making hollow glass bodies by means of a pressing mechanism which forms the glass into a given shape and of a blowing mechanism which blows the body from this shape into the desired shape. Such devices, briefly referred to as pressing-blowing devices are frequently used in apparatus for automatically making hollow glass bodies such as bulbs for electric incandescent lamps and the like. The molding mechanism which serves to give the glass a given shape mostly comprises a parison mold or former and a plunger. During the pressing operation the glass that comes in contact with the plunger and the former will become more chilled than the more internally situated glass parts. This is directly due to the heat conduction which takes place via the plunger and the former. Indeed the plunger and the former must have a comparatively low temperature to avoid the so-called "wetting" of the glass so that the temperature difference between glass and surface of former or plunger is very considerable. After the operation of blowing out the masses of glass thus formed are found to present in the majority of cases streaks and circles which are not only due to the intense heat conduction but probably also to the uneven surface-temperature of the plunger and former.

Now in pursuit of means to obviate this difficulty it has already been suggested that the plunger and the former and more particularly the parts of said plunger and former which come in contact with the glass, might be made of non-metallic material, for example, carbon or graphite or the like.

Although the transmission of heat is thus reduced the disadvantage remains that the surface-temperature of a plunger or former made in this manner cannot be controlled. As a result of the poor heat conduction of the said substances the heat given off by the glass will not be evenly distributed but give rise to locally greatly heated or greatly chilled parts of the plunger or former which obviously exert their direct deleterious effect on the glass to be operated upon. There is the additional disadvantage that it is mechanically very difficult to make the plunger and the former of the said material and that they rapidly get out of shape.

The advantage which could be offered by these plungers or formers owing to their poor heat transmission and consequently slight chilling of the glass contacting them is therefore lost owing to the surface of the plunger and the former which comes in contact with the glass obtaining an uneven temperature.

The invention has for its object such a construction of the plunger or former that a uniform surface-temperature of the plunger and the former is ensured and the heat transmission is at the same time maintained within definite limits.

According to the invention the part of the plunger or the former which comes in contact with the glass or with the part of the glass that has to be blown out is made of a metal of satisfactory heat conductivity and the construction of these parts of the plunger and/or the former is such that the heat transmission remains low but sufficient to maintain the surface-temperature of the plunger or the former below the limit where "wetting" occurs.

As the metal has a satisfactory conductivity for heat the surface-temperature of the plunger will be very even. If however no special measures were taken this great conductivity for heat would act injuriously as too much heat would be withdrawn from the glass. This difficulty can be obviated by such a construction of the part of the plunger which comes in contact with the glass or with the part of the glass that has to be blown out that the heat transmission is low. This may for example be ensured by making the said part extremely thin so that the section along which heat transmission can take place is as little as possible. Care should, however, be taken that the heat transmission is not so slight that the parts of the plunger or former which come in contact with the glass are raised to such high temperatures that "wetting" ensues between the glass and the plunger or former. Indeed it is found, that any metal no matter whatever will stick to glass at definite temperatures. For some metals this temperature is very low, for others very much higher.

According to the invention the parts that come in contact with the glass to be blown are made of a metal that is not readily oxidized for example, precious metals or aluminium or more generally alloys of these metals. Very good results have been obtained by the part coming in contact with the glass or with the glass to be blown being made of silver, preferably pure silver. In addition to their good heat conduction the said metals have the advantage of being very easily operated.

According to an embodiment of the invention the plunger and the former have arranged on them a thin metal hood which comes in direct contact with the glass and which is supported by a layer of heat insulating material, for example asbestos-cement mixture, marble, soapstone or the like. The heat is essentially conducted away by the heat insulating material and only to a small extent by the metal itself. If the conductivity for heat of the insulating material is found to be still too slight, the said material may be artificially cooled.

When a plunger and a former in accordance with the invention are used the blown bodies are found to be devoid of any trace of streaks or circles and to correspond in quality to handblown bodies.

The invention will be more clearly understood by reference to the accompanying drawing in which a plunger and a former of an embodiment of the invention are shown to be adapted to cooperate.

Referring to the drawing, 10 designates the plunger and 11 the so-called parison mold or former which when pressed together leave a space of definite shape into which the glass is pressed. Both the plunger 10 and the former 11 are provided with silver coatings 12 and 13 which rest on layers 14 and 15 of insulating material, for example an asbestos-cement mixture, which is cooled by cooling devices. The latter consist of supply and discharge conduits 16 and 17 for a cooling liquid which is supplied and discharged in chambers 19 and 18. The silver coatings 12 and 13 are clamped between parts 20 and 21 or 22 or 23 respectively which are in engagement with each other by means of threads.

During the operation of preliminarily forming a given body the silver coating of the plunger and the former will come in direct contact with the glass so that these parts are raised to a considerable temperature. Owing to the good heat conductivity of the silver, the surface-temperature will be very even. The heat is conducted away partly by the parts 15 and 14 and partially by the annular flanges of the silver coatings 12 and 13. The heat transmitted to the parts 14 and 15 is conducted away by the cooling water. If the temperature to which the silver parts 12 and 13 are raised is found to be too high it is either possible to thicken these coatings or to make the parts 14 and 15 of another material or so to reduce their dimensions that a better heat transmission ensues.

This pressing device is of particularly great advantage to automatic bulb blowing machines as it considerably improves the quality of the products made by these machines and materially limits the shrinkage or loss of the said machines.

What I claim is:

1. A pressing device comprising a plunger and a former adapted for pressing glass to a preliminary shape, prior to its being blown, the parts of the said plunger and former which contact with the glass comprising a hood made of a metal of great heat conductivity, heat insulating material, with which the said hood contacts on its side remote from the glass, comprising the remainder of the plunger and former, the thickness of the metal hood being sufficiently great, dependent upon the mass and substance of the heat insulating material and the mass of the glass charge, to efficiently conduct away sufficient heat from the glass charge to maintain the surface temperature of the glass charge substantially uniform, while maintaining the surface temperature of the plunger and former below the limit where wetting occurs.

2. A pressing device comprising a plunger and a parison mould, each of which consists of a body portion of soapstone and a thin metal hood of silver, the thickness of the silver being sufficiently great, dependent upon the mass of the soapstone and the mass and substance of the charge in the mould, to efficiently conduct away sufficient heat from the charge to maintain the surface temperature of the charge sufficiently uniform, while maintaining the surface temperature of the plunger or mould below the limit where wetting occurs.

3. A pressing device consisting of a plunger and former adapted to preliminarily shape glass prior to its being blown out, each of said plunger and former comprising a part adapted to contact with the glass charge and made of a metal of great heat conductivity, and a body of heat insulating material adapted to support said part, the thickness of the metal being sufficiently great, dependent upon the mass and substance of the heat insulating material and the mass of the glass charge, to efficiently conduct away sufficient heat from the glass body to maintain the surface temperature of the glass body substantially uniform, while maintaining the surface temperature of the plunger and former below the limit where wetting occurs, and means for cooling said body of heat insulating material.

4. A pressing device consisting of a plunger and a mould, each of which comprises in combination, a body formed of asbestos cement mixture, and a hood covering said body and formed of silver, the thickness of the silver hood being sufficiently great, dependent upon the means of the asbestos cement mixture and the mass and substance of the charge in the mould, to efficiently conduct away sufficient heat from the charge to maintain the surface temperature of the charge substantially uniform, while maintaining the surface temperature of the plunger and mould below the limit where wetting occurs.

In testimony whereof I affix my signature at the city of Eindhoven, this 19th day of April, 1928.

JAN JESAIJAS CHRISTIAAN HARDENBERG.